United States Patent
Hiroe

(10) Patent No.: US 8,286,326 B2
(45) Date of Patent: Oct. 16, 2012

(54) METHOD OF MANUFACTURING CORE, METHOD OF MANUFACTURING TRIM, AND CORE MANUFACTURED BY THE SAME

(75) Inventor: Keiji Hiroe, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 354 days.

(21) Appl. No.: 12/725,044

(22) Filed: Mar. 16, 2010

(65) Prior Publication Data
US 2010/0239826 A1  Sep. 23, 2010

(30) Foreign Application Priority Data

Mar. 18, 2009 (JP) ................. 2009-065471
Jan. 8, 2010 (JP) ................. 2010-003133

(51) Int. Cl.
*B21B 1/46* (2006.01)
*B23B 1/00* (2006.01)
(52) U.S. Cl. ...................... 29/527.4; 428/174
(58) Field of Classification Search ............ 29/527, 29/413, 6.1, 896.6; 428/174, 122; 264/101.1; 72/324, 186; 49/479.1, 490.1, 498.1
See application file for complete search history.

(56) References Cited

U.S. PATENT DOCUMENTS

| | | | | |
|---|---|---|---|---|
| 3,550,246 | A | * 12/1970 | Zoller | 29/413 |
| 4,038,898 | A | * 8/1977 | Kniepkamp et al. | 84/708 |
| 4,884,370 | A | * 12/1989 | Nozaki et al. | 49/479.1 |
| 2003/0082337 | A1 | 5/2003 | Mizuno et al. | |

FOREIGN PATENT DOCUMENTS

| | | |
|---|---|---|
| JP | U 56-39337 | 4/1981 |
| JP | A 58-76343 | 5/1983 |
| JP | A 5-237904 | 9/1993 |
| JP | A 7-117577 | 5/1995 |
| JP | A 11-48304 | 2/1999 |
| JP | A 2000-52892 | 2/2000 |
| JP | A 2003-200791 | 7/2003 |
| JP | A 2004-9355 | 1/2004 |
| JP | A 2005-14792 | 1/2005 |
| JP | A 2008-230448 | 10/2008 |

* cited by examiner

*Primary Examiner* — John C Hong
(74) *Attorney, Agent, or Firm* — Oliff & Berridge, PLC

(57) ABSTRACT

A method of manufacturing an elongated core which is buried in an elongated trim. The method includes, forming slits to a metal plate, which extend in a second direction, at predetermined intervals in a first direction so as to form core pieces between the adjacent slits; and rolling a portion of the metal plate in which the slits are not formed in the second direction to form a rolled portion extending in the first direction, and expanding the slits in the first direction to form spaces, thereby preparing a primary core in which the core pieces and the spaces are alternately provided in the first direction. Additionally, the method includes, supplying the primary core to between a pair of deformed portion forming rollers engaged with each other such that reinforcing defaulted portions extending in the second direction are repetitively formed in the first direction.

14 Claims, 8 Drawing Sheets

B-B SECTIONAL VIEW

METHOD OF MANUFACTURING CORE, METHOD OF MANUFACTURING TRIM, AND CORE MANUFACTURED BY THE SAME

CROSS-REFERENCE TO RELATED APPLICATIONS

This application claims priority from Japanese Patent Application No. 2009-065471 filed on Mar. 18, 2009, and Japanese Patent Application No. 2010-003133 filed on Jan. 8, 2010, and the entire contents of which are incorporated herein by reference.

TECHNICAL FIELD

The present invention relates to a method of manufacturing an elongated core buried in an elongated trim made from a polymer material, a method of manufacturing a trim, and a core manufactured by the same.

BACKGROUND

In general, an elongated trim is mounted on a flange of a door opening fringe or an opening fringe of a trunk or hatchback of a vehicle such as car along the flange. The trim is extruded in a shape having a mounting portion which is substantially U-shaped in cross section, using a polymer material such as rubber or thermoplastic synthetic resin including thermal plastic elastomer. The U-shaped mounting portion interposes the flange of the opening fringe from both sides such that the trim is fixed to the flange. In such a trim, an elongated reinforcing core (for example, a core formed of a strip-shaped metal plate such as a cold rolled steel plate) having a U-shaped cross section corresponding to the mounting portion is buried and integrated in the mounting portion. Then, the core reinforces the mounting portion such that the mounting portion is stably fixed to the flange of the opening fringe.

However, the flange of a door opening fringe or the opening fringe of a trunk or hatchback of a vehicle is two- or three-dimensionally bent in the longitudinal direction. Therefore, the trim formed in a substantially straight line shape by extrusion molding is mounted so as to be bent in accordance with the bending shape of the flange of the opening fringe. Accordingly, a core having a plurality of spaces formed at predetermined intervals in the longitudinal direction is used as the core buried in the trim. The core is flexibly bent in accordance with the bending of the trim. The core may include a fish-bone core and a keel core.

Parts used in a vehicle such as a car require a reduction in weight. When the thickness of the core is simply decreased to reduce the weight of a trim, the rigidity of the core may be degraded. Therefore, when a trim having a core buried therein is mounted on the flange of an opening fringe, the holding force of the trim is reduced, by which the flange is interposed and held. The trim may not be stably fixed to the flange.

As disclosed in Patent Documents 1 to 3, a plurality of gaps (or slits) are punched and formed at predetermined intervals in a longitudinal direction of a strip-shape metal plate by pressing to form an insert for the trim in which core pieces and gaps (or slits) are alternately provided in the longitudinal direction. As deformed portion (or convex portion) is press-molded in the core piece at the same time when the gaps (or slits) are punched and formed in the strip-shaped metal plate by pressing, the rigidity of the insert for trim is secured by the deformed portion (or convex portion) and the thickness of the insert for trim is reduced. Then, the holding force of the trim may be secured and the trim is reduced in weight.

However, when the gaps (or slits) are punched and fanned in the strip-shaped metal plate by pressing, defects may occur because the punched portion of the strip-shaped metal plate becomes unnecessary. Then, yield may decrease.

Patent Document 4 discloses a strip-shaped insert in which cut lines are formed at a predetermined pitch in both widthwise sides of the strip-shaped insert in the longitudinal direction thereof, and then rolled and extended in the longitudinal direction to form slits at predetermined intervals.
[Patent Document 1] JP-A-2004-9355
[Patent Document 2] JP-A-2005-14792
[Patent Document 3] JP-A-2008-230448
[Patent Document 4] JP-A-7-117577

As described in Patent Document 4, even when a portion of the strip-shaped insert in which the cut lines are not formed is rolled to form the insert provided with slits, deformed portions (or convex portions) are press-molded in the insert by pressing, after the portion of the strip-shaped insert in which the cut lines are not formed is rolled to form the insert provided with slits by using the techniques of Patent Documents 1 to 3 in which the deformed portion (or convex portion) is press-molded in the insert by pressing. Therefore, the rigidity of the insert is secured by the deformed portion (or convex portion) and the thickness of the insert is reduced.

However, when the deformed portion (or convex portion) is press-molded by pressing, the supply (transfer) of the insert needs to be temporarily stopped at each press-molding timing of the deformed portion (or convex portion). Therefore, the deformed portion (or convex portion) may be not efficiently formed in the insert. Therefore, when the insert is continuously transferred and supplied and the deformed portion (or convex portion) is press-molded in synchronization with the extrusion molding of the trim in a trim manufacturing line, the trim may not be efficiently manufactured.

Additionally, when the portion of the strip-shaped insert in which the cut lines are not formed is rolled to form the insert provided with slits, deviations may occur in the length of the slits (the dimension of the slits in the longitudinal direction of the insert) due to deviations in the thickness or composition of the metal material in the rolled portion. Then, a deviation may occur in the gap between the core pieces formed between the slits. Therefore, when the deformed portion (or convex portion) is press-molded by pressing, a deviation may occur in the formation position of the deformed portion (convex portion) with respect to the core piece in the longitudinal direction of the insert, and a core piece in which the deformed portion (or convex portion) is partially formed may be formed. Accordingly, it is difficult to sufficiently secure rigidity by the deformed portion (convex portion), and deviation occurs in the rigidities of the respective core pieces.

SUMMARY

Accordingly, an exemplary embodiment of the present invention may make it possible to efficiently form reinforcing deformed portions in a core and to secure the holding force of a trim and the trim having a core buried therein is reduced in weight. Additionally, an exemplary embodiment of the present invention may make it possible to sufficiently secure the rigidity of the core, the rigidity based on reinforcing deformed portions, even when deviations occur in the length of spaces of the core (the dimension of the spaces in the longitudinal direction of the core), and to reduce deviations in the rigidities of the respective core pieces.

According to an illustrative aspect of the invention, there is provided a method of manufacturing an elongated core which is buried in an elongated trim made from a polymer material, the method comprising: a primary core preparatory step comprising a slit forming step and a rolling step to prepare a primary core in which core pieces and spaces are alternately provided in a longitudinal direction of the primary core, wherein the longitudinal direction of the primary core being a first direction and a width direction of the primary core being a second direction; wherein the slit forming step being performed by supplying an elongated strip-shaped metal plate to between a pair of slitter rollers engaged with each other, forming slits, which extend in the second direction in a state in which the slits are not formed to a portion of the strip-shaped metal plate in the second direction, at predetermined intervals in the first direction so as to form the core pieces between the adjacent slits; and wherein the rolling step being performed by supplying the strip-shaped metal plate having the slits formed therein to between a pair of rolling rollers, rolling the portion of the strip-shaped metal plate in which the slits are not formed in the second direction to form a rolled portion extending in the first direction, and expanding the slits in the first direction to form the spaces; and a deformed portion forming step being performed by supplying the primary core to between a pair of deformed portion forming rollers engaged with each other such that reinforcing deformed portions extending in the second direction are repetitively formed in the first direction.

According to another illustrative aspect of the invention, there is provided a method of manufacturing an elongated trim made from a polymer material, wherein an elongated core is buried in the elongated trim, the method comprising: an elongated core providing step to provide the elongated core which is formed by, preparing a primary core by performing slit forming and rolling in which core pieces and spaces are alternately provided in a longitudinal direction of the primary core, wherein the longitudinal direction of the primary core being a first direction and a width direction of the primary core being a second direction, wherein the slit forming being performed by supplying an elongated strip-shaped metal plate to between a pair of slitter rollers engaged with each other, forming slits, which extend in the second direction in a state in which slits are not formed to a portion of the strip-shaped metal plate in the second direction, at predetermined intervals in the first direction so as to form the core pieces between the adjacent slits, and wherein the rolling being performed by supplying the strip-shaped metal plate having the slits formed therein to between a pair of rolling rollers, rolling the portion of the strip-shaped metal plate in which the slits are not formed in the second direction to form a rolled portion extending in the first direction, and expanding the slits in the first direction to form the spaces, and supplying the primary core to between a pair of deformed portion forming rollers engaged with each other such that reinforcing deformed portions extending in the second direction are repetitively formed in the first direction, thereby providing the elongated core in which the reinforcing deformed portions are formed in the second direction in a portion of the elongated core excluding the rolled portion; an extrusion step being performed by continuously supplying the elongated core to an extrusion mold for molding the trim, supplying a polymer material to the extrusion mold to mold the trim, and burying the elongated core in the trim; a treatment step being performed by curing or solidifying the polymer material portion of the trim; a connection portion breaking step being performed by pulling and bending the trim to break a portion of the rolled portion of the elongated core buried in the trim, the portion being adjacent to the space in the second direction; and a final cross section forming step being performed by forming the trim and the elongated core in a predetermined final cross-sectional shape.

According to another illustrative aspect of the invention, there is provided an elongated core which is buried in an elongated trim made from a polymer material, wherein a longitudinal direction of the elongated core being a first direction and a width direction of the elongated core being a second direction, comprising: convex and concave deformed portions serving as reinforcing deformed portions, wherein the convex and concave portions are formed by, preparing a primary core by performing slit forming and rolling in which core pieces and spaces are alternately provided in the first direction, wherein the slit forming being performed by supplying an elongated strip-shaped metal plate to between a pair of slitter rollers engaged with each other, forming slits, which extend in the second direction in a state in which the slits are not formed to a portion of the strip-shaped metal plate in the second direction, at predetermined intervals in the first direction so as to form the core pieces between the adjacent slits; and wherein the rolling being performed by supplying the strip-shaped metal plate having the slits formed therein to between a pair of rolling rollers, rolling the portion of the strip-shaped metal plate in which the slits are not formed in the second direction to form a rolled portion extending in the first direction, and expanding the slits in the first direction to form the spaces, and supplying the primary core to between a pair of deformed portion forming rollers engaged with each other such that reinforcing deformed portions extending in the second direction are repetitively formed in the first direction, wherein the convex and concave deformed portions are alternately formed in the first direction, and wherein the convex and concave deformed portions are formed so as to be continuously S-shaped in a cross section along the first direction.

DESCRIPTION

Hereinafter, exemplary embodiments of the present invention will be described.

Figure 1:
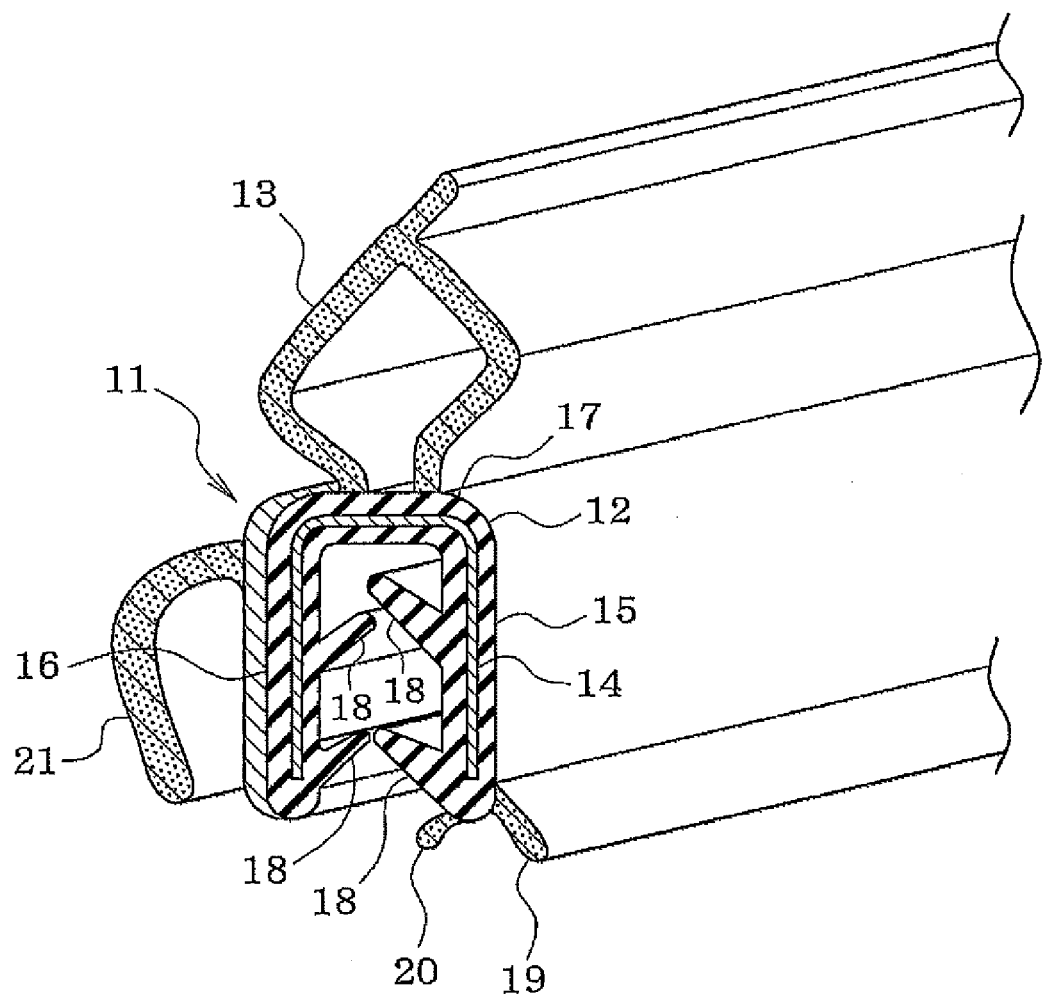
FIG. 1 is a perspective view of a trim according to an embodiment of the present invention.

As illustrated in FIG. 1, an elongated trim 11 which is a so-called trunk seal trim is mounted on a flange (not shown) of a trunk opening fringe of a body panel of a vehicle or the like. The elongated trim 11 includes a mounting portion 12 and a tubular hollow sealing portion 13 which are integrally formed by extrusion molding using an elastic polymer material such as rubber or thermoplastic synthetic resin including thermoplastic elastomer. The mounting portion 12 is formed in a U-shaped cross-sectional shape, and the tubular hollow sealing portion 13 is made from sponge rubber or a soft thermoplastic elastomer (TPE) material. The mounting portion 12 includes a core 14 buried therein by insert extrusion molding which is also called composite extrusion molding, the core 14 being formed of a strip-shape metal plate.

The mounting portion 12 includes an exterior side wall portion 15, an interior side wall portion 16, and a bottom wall portion 17 connecting both of the exterior and interior wall portions 15 and 16. The tubular hollow sealing portion 13 is integrally provided on the outer surface of the bottom wall portion 17. The exterior side wall portion 15 and the interior side wall portion 16 include holding lips 18 integrated on the inner surfaces thereof, the holding lips 18 protruding toward a direction in which they face each other. In this embodiment of the present invention, two holding lips 18 are formed on the exterior side wall portion 15 and the interior side wall portion 16, respectively. The core 14 buried in the mounting portion 12 extends to the vicinities of tip ends of the exterior and interior side wall portions 15 and 16, around which the holding lips 18 at the tip end side are formed. The core 14 reinforces the mounting portion 12 such that the mounting portion 12 may be stably fixed to the flange of the trunk opening fringe.

When the mounting portion 12 of the trim 11 is mounted on the flange of the trunk opening fringe such that the flange is covered with the mounting portion 12, the respective holding lips 18 are abutted on the flange and elastically deformed to interpose the flange from both of the exterior and interior sides such that the trim 11 is mounted on the flange. Furthermore, when the trunk lid or hatchback (not shown) is closed, the trunk lid is abutted on the tubular hollow sealing portion 13 to elastically deform the tubular hollow sealing portion 13. Then, the space between the trunk lid and the body panel (not shown) is sealed by the tubular hollow sealing portion 13.

At or around the tip end portion of the exterior side wall portion 15 of the mounting portion 12, a first sealing lip 19 and a second sealing lip 20, which are made from sponge rubber or a soft TPE material, are integrally formed. The first sealing lip 19 protrudes toward the exterior side, and the second sealing lip 20 protrudes toward the interior side. When the trim 11 is mounted on the flange, the first and second sealing lips 19 and 20 are abutted on the body panel so as to be elastically deformed. Then, the space between the exterior side wall portion 15 of the mounting portion 12 and the body panel is sealed by the first and second sealing lips 19 and 20.

Meanwhile, a shielding lip 21 is integrally formed on the outer surface of the interior side wall portion 16 of the mounting portion 12. The shielding lip 21 protrudes toward the indoor side, and a tip end thereof is curved toward the mounting portion 12. When the trim 11 is mounted on the flange, a terminal of an interior member (not shown) inside the vehicle is covered with the shielding lip 21 made from sponge rubber or a soft TPE material.

Meanwhile, since the flange of the trunk opening fringe is two- or three-dimensionally bent or twisted in a longitudinal direction thereof, the trim 11 formed in the substantially straight line shape by extrusion molding is mounted so as to be bent in accordance with the bending shape of the flange. Therefore, the core 14 buried in the trim 11 has spaces 24 (refer to FIG. 2) formed at predetermined intervals in the longitudinal direction thereof such that the core 14 is flexibly bent in accordance with the bending of the trim 11.

Figure 2:
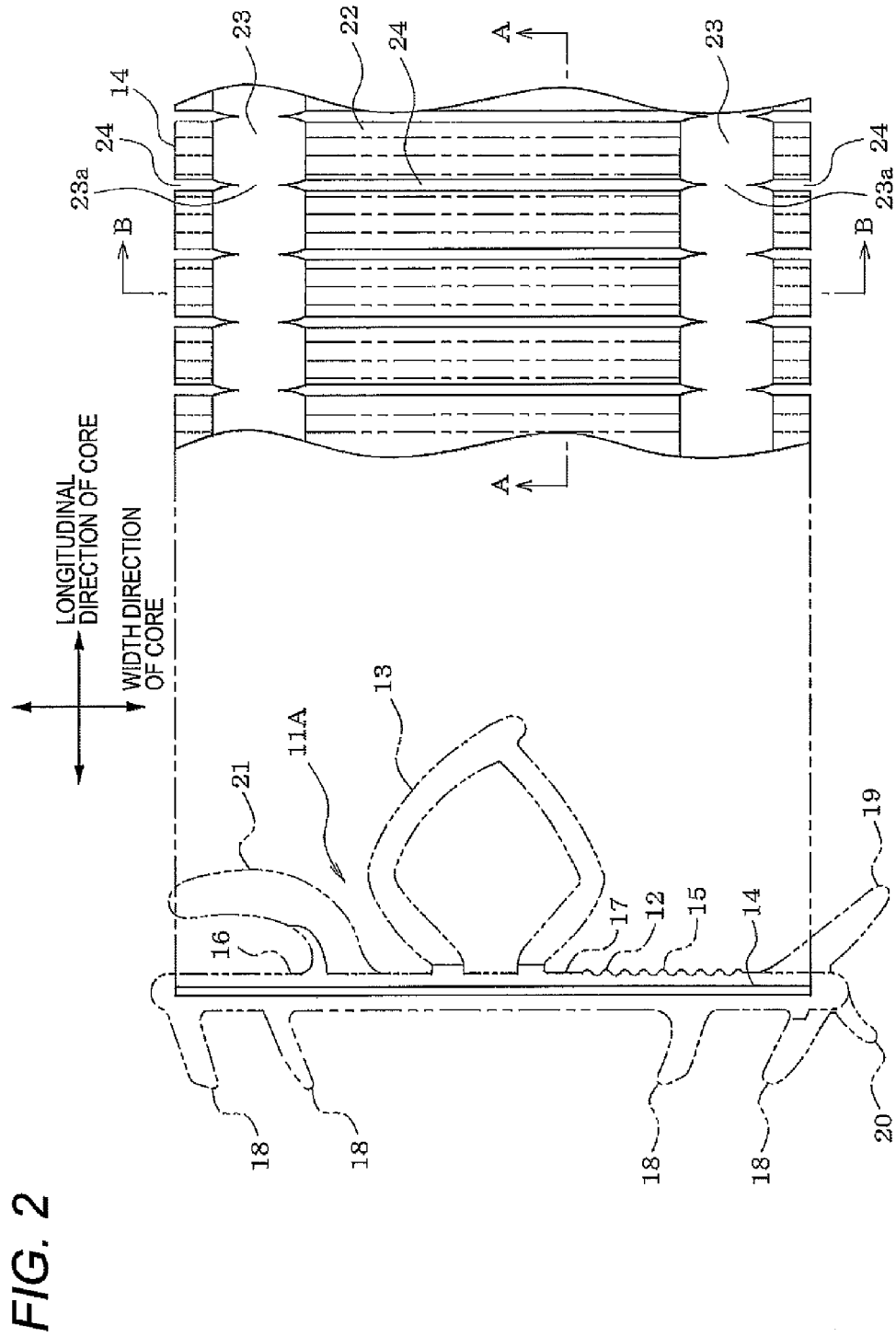
FIG. 2 is a plan view of a core.
Figure 3:
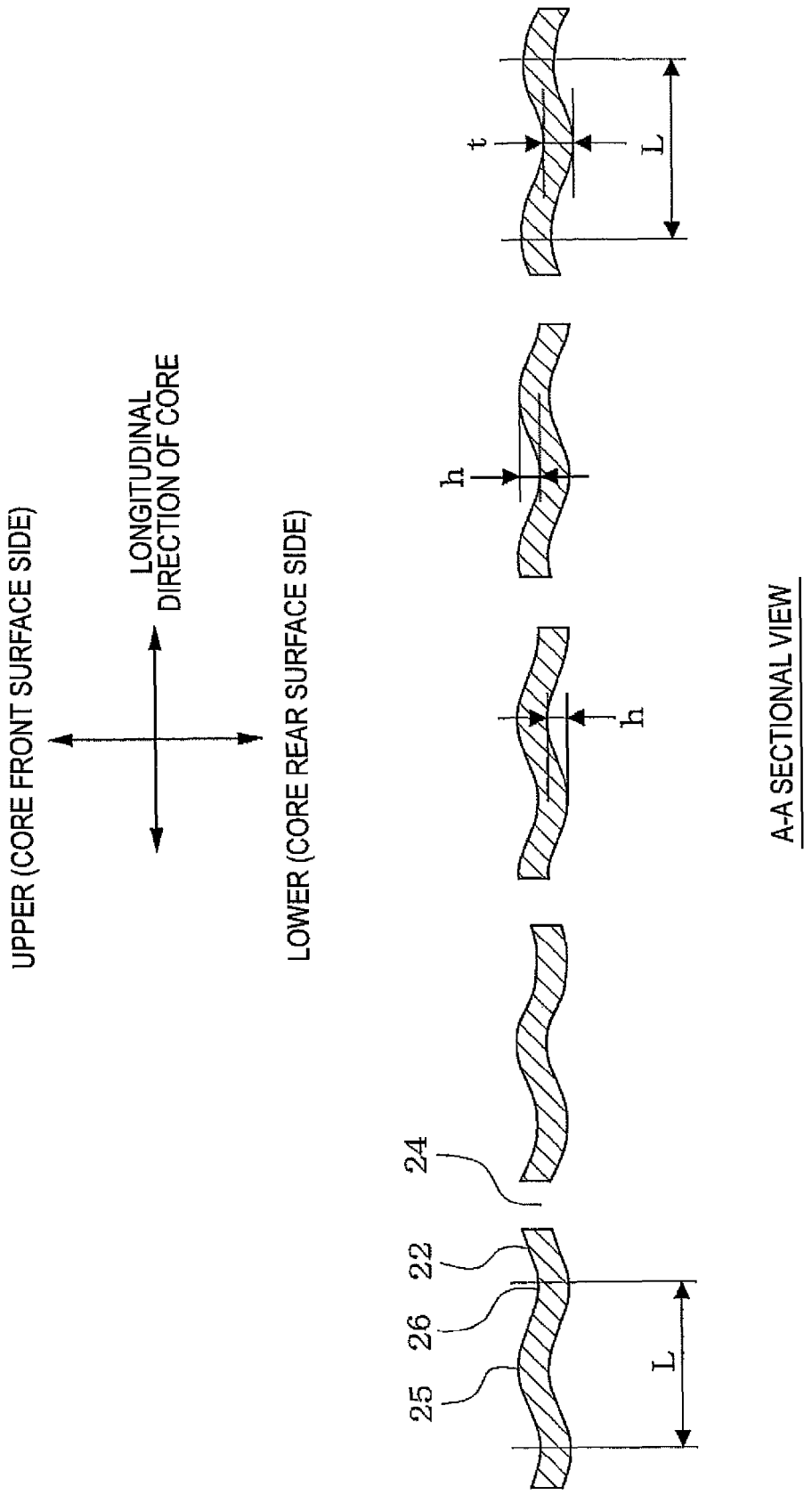
FIG. 3 is a cross-sectional view taken along a line A-A of FIG. 2.
Figure 4:
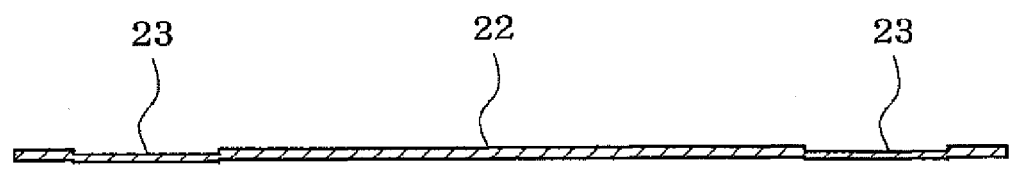
FIG. 4 is a cross-sectional view taken along a line B-B of FIG. 2.

Referring to FIGS. 2 to 4, the core 14 is formed of an elongated strip-shaped metal plate (for example, a cold rolled steel plate, a stainless steel plate, or an aluminum plate), and includes a plurality of core pieces 22 arranged at predetermined intervals in the longitudinal direction of the core 14 and a rolled portion 23 connecting the plurality of core pieces 22 in the longitudinal direction. The space 24 is provided between the adjacent core pieces 22. In this embodiment of the present invention, the rolled portion 23 connecting the core pieces 22 is provided in two lines along the longitudinal direction of the core 14, and the space 24 between the adjacent core pieces 22 is divided into three areas in a width direction of the core 14 by the rolled portion 23 formed in two lines. The rolled portion 23 may be provided in one line or three or more lines.

As illustrated in FIG. 3, each of the core piece 22 of the core 14 from which the rolled portion 23 is excluded includes a convex deformed portion (reinforcing deformed portion) 25 and a concave deformed portion (reinforcing deformed portion) 26 which are alternately formed in the longitudinal direction of the core 14 so as to extend in the width direction of the core 14. The convex and concave deformed portions 25 and 26 have the same shape in opposite directions (upward and downward directions in the drawing). For example, the convex and concave deformed portions 25 and 26 may be formed in a circular arc shape protruding in opposite directions. The cross section thereof taken along the longitudinal direction of the core 14 is formed in a continuous S-shape connecting through the space 24. The convex deformed portion 25 is a protrusion which protrudes upward from the upper surface of the core piece 22, and the concave deformed portion 26 is a protrusion which protrudes downward from the lower surface of the core piece 22. That is, the convex and concave deformed portions 25 and 26 are formed in such an S-shape as to be smoothly connected through the space 24, without a plane portion between the convex deformed portion 25 and the concave deformed portion 26 in the longitudinal direction. While the rigidity of the core 14 (core piece 22) is secured by the reinforcing deformed portions 25 and 26, the thickness t (refer to FIG. 3) of the core 14 (core piece 22) may be decreased to about 0.35 mm, for example. The protrusion height h (refer to FIG. 3) of the convex and concave deformed portions 25 and 26 is set to 0.2 mm, for example. In this embodiment of the present invention, the widthwise dimension of the core 14 is set to 34 mm, the widthwise dimension of the rolled portion 23 is set to 4 mm, the longitudinal dimension of the core piece 22 is set to 4 mm, the longitudinal dimension of the space 24 is set to 1±0.2 mm, and the longitudinal dimension L of the convex and concave deformed portions 25 and 26 is set to 3.2 mm. However, the longitudinal dimension L of the convex and concave deformed portions 25 and 26 may preferably be set to 3.2 mm or less in order to prevent exterior defects such as surface irregularities from occurring on the surface of the trim 11 due to the convex and concave deformed portions 25 and 26 of the core 14 when the core 14 is buried in the trim 11.

To increase the rigidity or strength of the core 14, the protrusion height h of the convex and concave deformed portions 25 and 26 may preferably be set in the range of 0.2 to 0.3 mm, when the thickness t of the core 14 is 0.35 mm. The core 14 may be formed of a hard cold rolled steel plate of which the Rockwell hardness HRB of SPCC-1B is 85 or more and the Vickers hardness is 170 or more. SPCC-1B is defined in JIS G 3141.

The longitudinal direction described herein refers to a direction corresponding to the longitudinal direction of the elongated core 14, as illustrated in FIG. 2. The width direction refers to a direction corresponding to the width direction of the elongated core 14. Furthermore, as illustrated in FIG. 3, the upward and downward direction refers to a direction corresponding to the thickness direction of the core 14. For example, the front surface side of the core 14 is set to the upward side, and the rear surface side of the core 14 is set to the downward side. Furthermore, the longitudinal dimension L of the convex deformed portion 25 is a distance between the bottoms of the two adjacent concave deformed portions 26, and the longitudinal dimension L of the concave deformed portion 26 is a distance between the peaks of the two adjacent convex deformed portions 25.

As illustrated in FIGS. 2 and 3, the core 14 is left-right symmetrical with respect to a center line in the width direction, and as described above, the convex and concave deformed portions 25 and 26 are alternately formed along the longitudinal direction. Therefore, when the trim 11 illustrated in FIG. 1 is manufactured as will be described below, either the front or rear surface of the core 14 is directed to the outer surface (or the inner surface) of the trim 11. In both cases, the same trim 11 may be formed, for example. Therefore, it is possible to prevent such an error in which the trim 11 is formed with the front and rear surfaces of the core 14 being reversed.

The convex and concave deformed portions 25 and 26 have the same shape in opposite directions (upward and downward direction). Therefore, when the trim 11 is manufactured, either the front or rear surface of the core 14 is directed to the outer surface (or the inner surface) of the trim 11. In both cases, the rigidity of the core 14 may be set to substantially the same value. Therefore, the holding force of the trim 11 may be maintained at the same value.

Hereinafter, a method of manufacturing the core 14 and a method of manufacturing the trim 11 will be described with reference to FIGS. 5 to 7.

Figure 5:
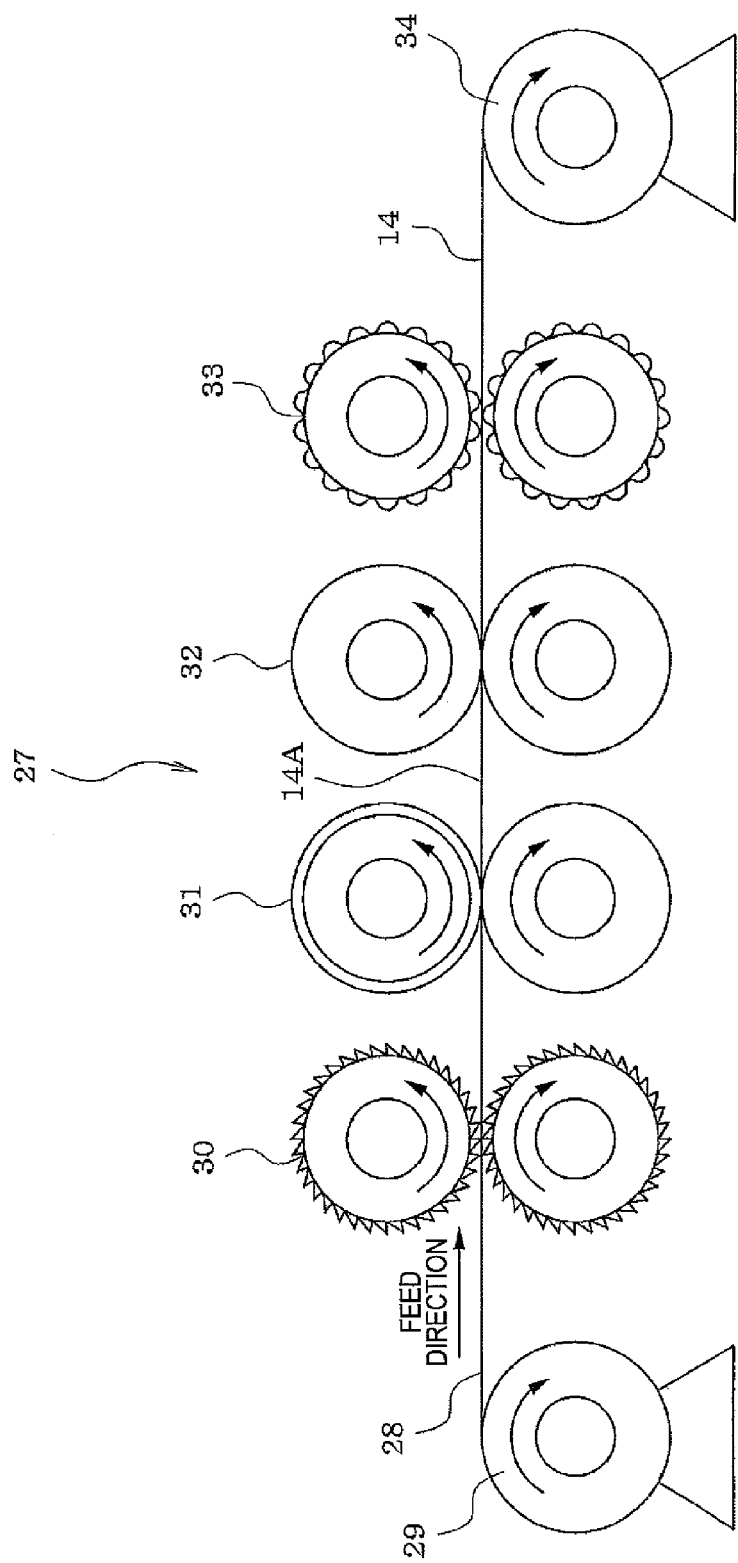
FIG. 5 is a schematic configuration view of an apparatus for manufacturing a core.

As illustrated in FIG. 5, an apparatus 27 for manufacturing a core includes an uncoiler 29 disposed at the most upstream side thereof, around which an elongated strip-shaped metal plate 28 is wound. In the downstream side of the uncoiler 29, a pair of slitter rollers 30 engaged with each other to perform slit forming, a pair of rolling rollers 31 performing rolling, a pair of calibrating rollers 32 performing calibration, and a pair of deformed portion forming rollers 33 engaged with each other to perform deformed portion forming are arranged in parallel toward the downstream side from the upstream side. At the most downstream side of the apparatus 27 for manufacturing a core, a winding roller 34 is disposed around which the core 14 is wound.

First, the apparatus 27 for manufacturing a core performs a core preparatory step. In the core preparatory step, the strip-shaped metal plate 28 is transferred from the uncoiler 29 so as to be supplied between the pair of slitter rollers 30, and the slitter rollers 30 perform slitting on the strip-shape metal plate 28. Then, slits (not shown) extending in the width direction of the strip-shaped metal plate 28 are formed at predetermined intervals in the longitudinal direction of the strip-shaped metal plate 28, in a state in which a portion of the strip-shaped metal plate 28 in the width direction thereof is left. The portion of the strip-shaped metal plate 28 becomes the rolled portion 23. Between the adjacent slits, the core piece 22 is formed.

After that, a rolling step is performed. First, the strip-shaped metal plate 28 (in which the slits are formed) transferred from the slitter rollers 30 is supplied between the pair of rolling rollers 31, and the rolling rollers 31 perform rolling on the strip-shaped metal plate 28. Then, the portion in which the slits are not formed in the width direction of the strip-shaped metal plate 28 and which becomes the rolled portion 23 is rolled in the longitudinal direction of the strip-shaped metal plate 28 to form the rolled portion 23 extending in the longitudinal direction of the strip-shaped metal plate 28. Furthermore, the slits are expanded in the longitudinal direction of the strip-shaped plate 28 to form spaces 24. At this time, as illustrated in FIG. 4, the rolling step may be performed in such a manner that only one or both of the front and rear surfaces of the portion becoming the rolled portion 23 is recessed. In this embodiment of the present invention, when the trim 11 and the core 14 are formed in a final cross-sectional shape (refer to FIG. 1) in a final cross-section forming step which will be described below, the rolled portion 23 is formed at a position other than a portion of the core 14 which is bent in the width direction.

In the rolling step, as the portion in which the slits are not formed in the width direction of the strip-shaped metal plate 28 and which becomes the rolled portion 23 is rolled in the longitudinal direction, the slits are expanded in the longitudinal direction to form the spaces 24. Therefore, a deviation may occur in the length of each space 24, that is, the dimension of the space 24 in the longitudinal direction of the core 14. However, the length of each core piece 22, that is, the dimension of the core piece 22 in the longitudinal direction of the core 14 is not changed after the rolling step.

As the slit forming step and the rolling step are performed in the core preparatory step, the core 14 in which the core pieces 22 and the spaces 24 are alternately provided in the longitudinal direction is formed without wasting the strip-shaped metal plate 28. That is, it is possible to prevent unnecessary portions from being formed by punching. Hereinafter, the core is referred to as 'primary core 14A'.

After the core preparatory step including the slit forming step and the rolling step is performed, a calibrating step is performed. First, the primary core 14A transferred from the rolling rollers 31 is supplied between the pair of calibrating rollers 32, and the calibrating rollers 32 perform calibration on the primary core 14A. The calibrating rollers 32 pressurize and planarize the primary core 14A to remove strain or deformation of the primary core 14A. Through the calibrating step, it is possible to remove the strain or deformation of the primary core 14A which may occur in the core preparatory step including the slit forming step and the rolling step. Meanwhile, when the strain or deformation does not occur in the primary core 14A during the core preparatory step (the slit forming step and the rolling step), the calibrating rollers 32 and the calibrating step may be omitted.

After that, a deformed portion forming step is performed. First, the primary core 14A transferred from the calibrating rollers 32 is supplied between the pair of deformed portion forming rollers 33, and the deformed portion forming rollers 33 perform deformed portion forming on the primary core 14A. Therefore, convex deformed portions 25 and concave deformed portions 26 extending in the width direction of the primary core 14A are alternately formed in the longitudinal direction of the primary core 14A.

Figure 6:
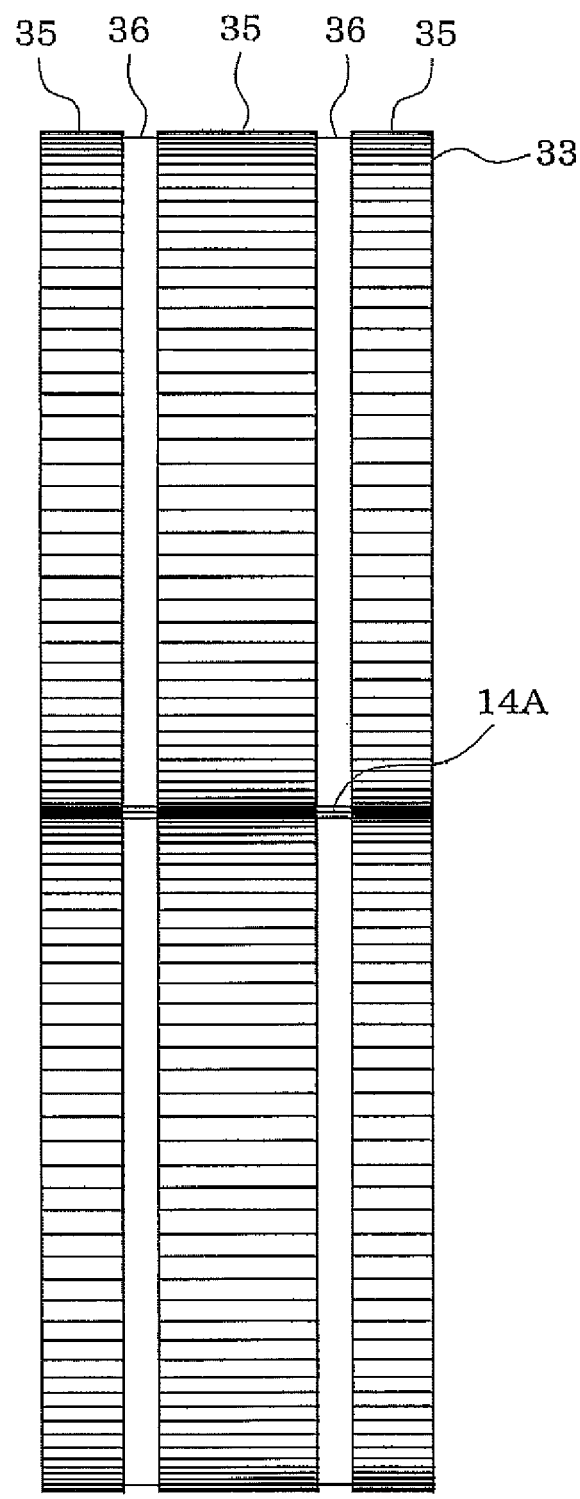
FIG. 6 is a diagram of deformed portion forming rollers seen from a downstream side.

As illustrated in FIG. 6, the deformed portion forming rollers 33 are arranged to interpose the primary core 14A from both of the front and rear surfaces thereof. Each of the deformed portion forming rollers 33 includes convex and concave patterns 35. The convex and concave patterns 35 are provided at a portion of the circumferential surface of the deformed portion forming rollers 33, which corresponds to the core piece 22 of the primary core 14A. The convex and concave patterns 35 are provided along the circumferential direction of the deformed portion forming rollers 33 such that the convex and concave deformed portions 25 and 26 are continuously S-shaped in a cross section following the longitudinal direction of the primary core 14A. That is, the convex and concave pattern 35 of the deformed portion forming roller 33 has a continuous S-shaped cross section along the circumferential direction. The circular-arc-shaped concave and convex patterns corresponding to the convex and concave deformed portions 25 and 26 of the core 14, respectively, are continuously formed in the same shape in opposite directions without a plane portion in the circumferential direction. Furthermore, a concave groove 36 is formed in a portion of the outer circumferential surface of the deformed portion forming roller 33, which corresponds to the rolled portion 23 of the primary core 14A, along the circumferential direction such that the convex and concave deformed portions 25 and 26 are not formed in the rolled portion 23.

While the core piece 22 of the primary core 14A is interposed and pressurized between the convex and concave patterns 35 of the deformed portion forming rollers 33, the primary core 14A is continuously transferred in the longitudinal direction. Then, as illustrated in FIG. 3, the convex and concave deformed portions 25 and 26 are formed in the core piece 22 of the primary core 14A, that is, the portion excluding the rolled portion 23 so as to have a continuous S-shaped cross section along the longitudinal direction of the primary core 14A, that is, a continuous S-shape cross-section through the spaces. Accordingly, the core 14 having the reinforcing deformed portions 25 and 26 formed therein is manufactured.

In this embodiment of the present invention, one or more convex deformed portions 25 and one or more concave deformed portions 26 are formed in each of the core pieces 22 at the deformed portion forming step, which makes it possible to reliably increase the rigidity of the core piece 22. Furthermore, the reinforcing deformed portions 25 and 26 are formed in such a manner that the thickness t of the core piece 22 after the forming of the reinforcing deformed portions 25 and 26 becomes constant in the longitudinal direction of the core 14. Therefore, the strength of the core 14 becomes constant in the longitudinal direction. Furthermore, as the reinforcing deformed portions 25 and 26 are formed at constant pitch and in a predetermined shape (at a constant protrusion height h), the reinforcing deformed portions 25 and 26 are regularly formed in the core 14, and the strength of the core 14 is constantly maintained. The longitudinal positions of the reinforcing deformed portions 25 and 26 in each of the core pieces 22 are not necessarily constant.

Then, as illustrated in FIG. 5, the core 14 (in which the reinforcing deformed portions 25 and 26 are formed) transferred from the deformed portion forming rollers 33 is supplied to the winding roller 34, and the winding roller 34 winds the core 14.

Figure 7:
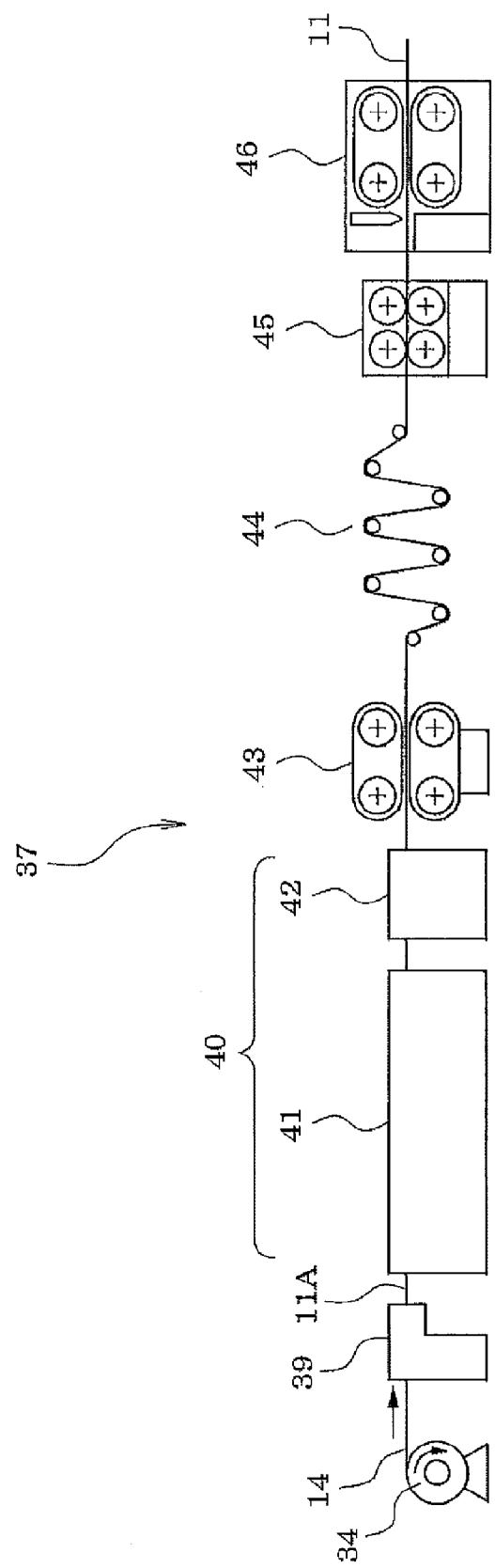
FIG. 7 is a schematic configuration view of an apparatus for manufacturing a trim.

As illustrated in FIG. 7, the winding roller 34 around which the core 14 having the reinforcing deformed portions 25 and 26 formed therein is wound is disposed in the most upstream side of an apparatus 37 for manufacturing a trim, and the core 14 is transferred from the winding roller 34 so as to be supplied to an extrusion machine 39. In this case, the winding roller 34 may be omitted, and the core 14 (in which the reinforcing deformed portions 25 and 26 are formed) transferred from the deformed portion forming rollers 33 of the apparatus 27 for manufacturing a core may be directly supplied to the extrusion machine 39 of the apparatus 37 for manufacturing a trim.

The extrusion machine 39 performs an extrusion step in which a trim 11A having a predetermined intermediate cross sectional shape (refer to dashed-two dotted lines of FIG. 2) is extruded to bury the core 14 in the mounting portion 12 of the trim 11A. While continuously supplying the core 14 to an extrusion mold by which the trim 11A having an intermediate cross sectional shape is extruded, the extrusion machine 39 supplies a polymer material to the extrusion mold to extrude the trim 11A including the mounting portion 12 and the tubular hollow sealing portion 13. Accordingly, the core 14 is covered with the polymer material, and buried in the mounting portion 12 of the trim 11A having an intermediate cross sectional shape such that the core 14 and the trim 11A are integrated.

When the polymer material to mold the trim 11A is rubber (for example, ethylene propylene diene Monomer (EPDM) rubber), the trim 11A extruded from the extrusion machine 39 is supplied to a cure treatment machine 40. The cure treatment machine 40 performs a treatment step in which a heating machine 41 (for example, a high-frequency heating machine or a hot-air heating machine) heats the trim 11A such that the body of the trim 11A, which is an unvulcanized rubber portion extruded by the extrusion machine 39, is vulcanized and cured. After the body of the trim 11A is vulcanized and cured, the trim 11A is cooled down by a cooling machine 42 such as a cooling tank, if necessary.

When the polymer material to mold the trim 11A is a thermoplastic synthetic resin including thermoplastic elastomer, the heating machine 41 of the cure treatment machine 40 is omitted, and the cure treatment machine 40 performs a treatment step in which the trim 11A heated and extruded in a molten state from the extrusion machine 39 is cooled down by the cooling machine 42 such as a cooling tank to solidify the body of the trim 11A, which is an unsolidified resin portion extruded by the extrusion machine 39.

After that, a connection portion breaking step is performed as follow. First, the trim 11A having an intermediate cross-sectional shape is supplied to a core separation machine 44, while being drawn by a drawing machine 43. Then, the trim 11A is bent by a plurality of breaking rollers provided in the core separation machine 44, while being pulled. Accordingly, a connection portion 23a (refer to FIG. 2) of the rolled portion 23 of the core 14 buried in the trim 11A, which is a portion adjacent to the space 24 in the width direction of the core 14, is broken to separate the respective core pieces 22 of the core 14.

After that, the trim 11A having an intermediate cross-sectional shape is supplied to a trim cold roll forming machine 45. The trim cold roll forming machine 45 performs a final cross section forming step in which the mounting portion 12 of the trim 11A is molded in a final cross-sectional shape (refer to FIG. 1). The trim cold roll forming machine 45 gradually deforms the mounting portion 12 of the trim 11A with the core 14 buried in the mounting portion 12 by using plural pairs (for example, two pairs) of molding rollers such that the mounting portion 12 is molded in the final cross-sectional shape.

The trim 11 having the final cross-sectional shape and transferred from the trim cold roll forming machine 45 is supplied to a cutting machine 46. The cutting machine 46 cuts the trim 11 into a predetermined length. Then, the manufacturing of the trim 11 having the core 14 buried therein is completed.

In the above-described embodiment of the present invention, the primary core 14A comprising the core pieces 22 and the spaces 24 is supplied between the pair of deformed portion forming rollers 33. The deformed portion forming rollers 33 perform the deformed portion forming step in which the reinforcing convex and concave deformed portions 25 and 26 are repetitively formed in the primary core 14A. Therefore, while the primary core 14A is continuously transferred and supplied to the deformed portion forming rollers 33, the reinforcing deformed portions 25 and 26 are formed in the primary core 14A by the deformed portion forming rollers 33. Therefore, it is possible to efficiently form the reinforcing deformed portions 25 and 26 in the core 14. Furthermore, as the reinforcing deformed portions 25 and 26 are formed in the core 14, the rigidity of the core 14 is secured by the reinforcing deformed portions 25 and 26 and the thickness of the core 14 is reduced. As a result, it is possible to secure a holding force of the trim 11 while the trim 11 having the core 14 buried therein is reduced in weight.

In this embodiment of the present invention, since the convex and concave deformed portions 25 and 26 are alternately formed in the longitudinal direction of the primary core 14A, the core 14 is reinforced by both of the convex and concave deformed portions 25 and 26. Therefore, it is possible to increase the rigidity of the core 14. Furthermore, the convex and concave deformed portions 25 and 26 are formed so as to be continuously S-shaped in a cross section along the longitudinal direction of the primary core 14A with the spaces therebetween. Therefore, although a deviation occurs in the length of the spaces 24 of the core 14, that is, the dimension of the spaces 24 in the longitudinal direction of the core 14, the reinforcing deformed portions 25 and 26 (the convex and concave deformed portions 25 and 26) are farmed in a continuous S-shape in each of the core pieces 22. Therefore, the rigidity of the core 14 is sufficiently secured by the reinforcing deformed portions 25 and 26, and a deviation in the rigidities of the respective core pieces 22 is reduced.

Furthermore, since the convex and concave deformed portions 25 and 26 are continuously formed in each of the core pieces 22 without a plane portion between the convex and concave deformed portions 25 and 26 in the longitudinal direction, the entire area of the core 14 in the longitudinal direction is reinforced in comparison with a core having a plane portion in the longitudinal direction. Therefore, it is possible to further increase the rigidity. Furthermore, the lengths of the respective core pieces 22 are equal to one another, and the total length of the reinforcing deformed portions 25 formed in the respective core pieces 22 is equal to that of the reinforcing deformed portions 26, even though the formation positions of the reinforcing deformed portions 25 and 26 with respect to the core piece 22 deviate. Therefore, the rigidities or strengths of the respective core pieces 22 are equal to one another, and the core pieces 22 exhibit a stable strength without a deviation in rigidity.

Additionally, in this embodiment of the present invention, the reinforcing deformed portions 25 and 26 are formed in the portion of the primary core 14A excluding the rolled portion 23. That is, the reinforcing deformed portions 25 and 26 are not formed in the rolled portion 23. Accordingly, in the connection portion breaking step, it is possible to easily break the connection portion 23a of the core 14 buried in the trim 11, that is, the portion of the rolled portion 23 adjacent to the space 24 in the width direction of the core 14. Furthermore, since the reinforcing deformed portions 25 and 26 are not formed in the rolled portion 23, it is possible to increase the rigidity of the core 14 and preventing a reduction in the length of the core 14 and an increase in weight per unit length of the core 14. As a result, it is possible to increase the holding force of the trim 11 and preventing an increase in weight per unit length of the trim 11.

In this embodiment of the present invention, when the trim 11 and the core 14 are formed in the final cross-sectional shape in the final cross section forming step, the rolled portion 23 is formed at a position other than a portion of the core 14 which is bent in the width direction thereof. Therefore, a reduction in the bending rigidity of the core 14 formed in the final cross-sectional shape is prevented, which makes it possible to secure the holding force of the trim 11 formed in the final cross-sectional shape.

In the above-described embodiment of the present invention, one or more convex deformed portions 25 and one or more concave deformed portions 26 are formed in each of the core pieces 22 in the longitudinal direction. However, without being limited thereto, at least one of the convex and concave deformed portions 25 and 26 may be formed in each of the core pieces 22.

In the above-described embodiment of the present invention, the slit forming step and the rolling step are performed to form the primary core 14A having the core pieces 22 and the spaces 24 in the core preparatory step. However, the slit forming step and the rolling step may be omitted, and a primary core 14A formed by the slitting step and the rolling step may be obtained from outside (for example, a core maker or the like).

Figure 8:
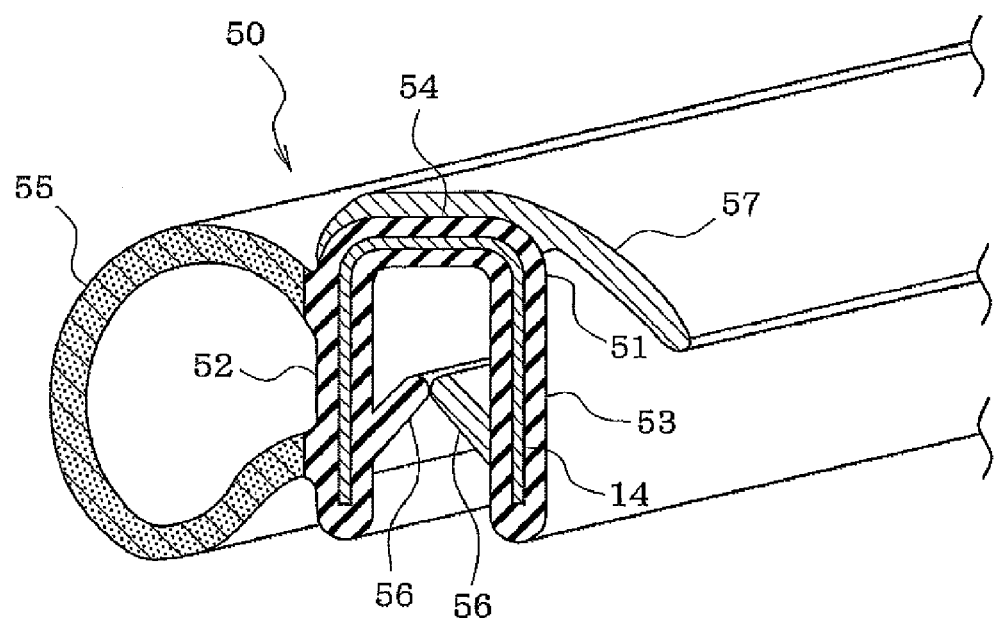
FIG. 8 is a perspective view of a trim according to another embodiment of the present invention.

The above-described embodiment of the present invention is applied to the elongated trim 11 (so-called trunk seal trim) which is mounted in a flange of a trunk opening fringe of a body panel of a vehicle or the like. As illustrated in FIG. 8, however, the embodiment of the present invention may be applied to an elongated trim 50 (so-called trunk seal trim) which is mounted on a flange of a door opening fringe of a body panel of a vehicle or the like. The trim 50 includes a tubular hollow sealing portion 55 integrated on the outer surface of an exterior side wall portion 52 of a mounting portion 51. Furthermore, holing lips 56 are integrally foamed on the inner surface of the exterior side wall portion 52 and the inner surface of an interior side wall portion 53, respectively, and a shielding lid 57 is integrally formed on the outer surface of a bottom wall portion 54.

In the embodiment of the present invention, the shapes of the respective portions of the trim (the mounting portion, the sealing portion, and so on), the shapes of the respective portions of the core (the core pieces, the rolled portion, the spaces, the reinforcing deformed portions and so on), and the pitch of the reinforcing deformed portions may be modified in various manners, without departing from the scope and the spirit of the invention.

The application range of the present invention is not limited to the core buried in the trim mounted on a flange of a trunk opening fringe or door opening fringe of a body panel of a vehicle or the like, but may be extended to various cores buried in various trims.

What is claimed is:

1. A method of manufacturing an elongated core which is buried in an elongated trim made from a polymer material, the method comprising:

a primary core preparatory step comprising a slit forming step and a rolling step to prepare a primary core in which core pieces and spaces are alternately provided in a longitudinal direction of the primary core, wherein the longitudinal direction of the primary core being a first direction and a width direction of the primary core being a second direction;

wherein the slit forming step being performed by supplying an elongated strip-shaped metal plate to between a pair of slitter rollers engaged with each other, forming slits, which extend in the second direction in a state in which the slits are not formed to a portion of the strip-shaped metal plate in the second direction, at predetermined intervals in the first direction so as to form the core pieces between the adjacent slits; and wherein the rolling step being performed by supplying the strip-shaped metal plate having the slits formed therein to between a pair of rolling rollers, rolling the portion of the strip-shaped metal plate in which the slits are not formed in the second direction to form a rolled portion extending in the first direction, and expanding the slits in the first direction to form the spaces; and a deformed portion forming step being performed by supplying the primary core to between a pair of deformed portion forming rollers engaged with each other such that reinforcing deformed portions extending in the second direction are repetitively formed in the first direction.

2. The method according to claim 1,
wherein in the deformed portion forming step, convex and concave deformed portions serving as the reinforcing deformed portions are alternately formed in the first direction.

3. The method according to claim 2,
wherein in the deformed portion forming step, the convex and concave deformed portions are formed so as to be continuously S-shaped in a cross section along the first direction.

4. The method according to claim 2,
wherein in the deformed portion forming step, at least one of the convex and concave deformed portions is formed in each of the core pieces of the primary core.

5. The method according to claim 2,
wherein in the deformed portion forming step, the convex and concave deformed portions are formed to have at least one of a constant pitch and a constant shape in the first direction.

6. The method according to claim 2,
wherein in the deformed portion forming step, the convex and concave deformed portions have the same shape in opposite directions.

7. The method according to claim 1,
wherein in the deformed portion forming step, the reinforcing deformed portions are formed so that thickness dimensions of the core pieces after the forming of the reinforcing deformed portions becomes constant in the first direction.

8. The method according to claim 1,
wherein in the deformed portion forming step, the reinforcing deformed portions are formed in the second direction in a portion of the primary core from which the rolled portion is excluded.

9. The method according to claim 1, further comprising a calibrating step in which the primary core is supplied between a pair of calibrating rollers to remove at least one of strain and deformation of the primary core, after the primary core preparatory step.

10. A method of manufacturing an elongated trim made from a polymer material, wherein an elongated core is buried in the elongated trim, the method comprising:
an elongated core providing step to provide the elongated core which is formed by,
preparing a primary core by performing slit forming and rolling in which core pieces and spaces are alternately provided in a longitudinal direction of the primary core, wherein the longitudinal direction of the primary core being a first direction and a width direction of the primary core being a second direction, wherein the slit forming being performed by supplying an elongated strip-shaped metal plate to between a pair of slitter rollers engaged with each other, forming slits, which extend in the second direction in a state in which slits are not formed to a portion of the strip-shaped metal plate in the second direction, at predetermined intervals in the first direction so as to form the core pieces between the adjacent slits, and wherein the rolling being performed by supplying the strip-shaped metal plate having the slits formed therein to between a pair of rolling rollers, rolling the portion of the strip-shaped metal plate in which the slits are not formed in the second direction to form a rolled portion extending in the first direction, and expanding the slits in the first direction to form the spaces, and supplying the primary core to between a pair of deformed portion forming rollers engaged with each other such that reinforcing deformed portions extending in the second direction are repetitively formed in the first direction, thereby providing the elongated core in which the reinforcing deformed portions are formed in the second direction in a portion of the elongated core excluding the rolled portion;

an extrusion step being performed by continuously supplying the elongated core to an extrusion mold for molding the trim, supplying a polymer material to the extrusion mold to mold the trim, and burying the elongated core in the trim;

a treatment step being performed by curing or solidifying the polymer material portion of the trim;

a connection portion breaking step being performed by pulling and bending the trim to break a portion of the rolled portion of the elongated core buried in the trim, the portion being adjacent to the space in the second direction; and a final cross section forming step being performed by forming the trim and the elongated core in a predetermined final cross-sectional shape.

11. The method according to claim 10,
wherein when the trim and the elongated core are formed in the final cross-sectional shape in the final cross section forming step, the rolled portion is formed at a position other than a portion of the elongated core which is bent in the second direction.

12. The method according to claim 10,
wherein the trim is a door opening trim or trunk seal trim for a vehicle.

13. The method according to claim 10,
wherein when the polymer material for molding the trim is rubber, the polymer material portion of the trim is heated, vulcanized and cured in the treatment step.

14. The method according to claim 10,
wherein when the polymer material for molding the trim is thermoplastic resin, the polymer material portion of the trim is cooled down and solidified in the treatment step.

* * * * *